United States Patent
Song et al.

(10) Patent No.: US 11,309,743 B1
(45) Date of Patent: Apr. 19, 2022

(54) BALANCED-CURRENT CIRCUIT STRUCTURE AND PARAMETER DESIGN METHOD FOR BIFILAR WINDING COIL OF WIRELESS POWER TRANSFER

(71) Applicant: Harbin Institute of Technology, Harbin (CN)

(72) Inventors: Kai Song, Harbin (CN); Zhi Bie, Harbin (CN); Chao Wang, Harbin (CN); Guang Yang, Harbin (CN); Chunbo Zhu, Harbin (CN); Rengui Lu, Harbin (CN)

(73) Assignee: Harbin Institute of Technology, Harbin (CN)

( * ) Notice: Subject to any disclaimer, the term of this patent is extended or adjusted under 35 U.S.C. 154(b) by 0 days.

(21) Appl. No.: 17/195,863

(22) Filed: Mar. 9, 2021

(30) Foreign Application Priority Data

Nov. 17, 2020 (CN) .......................... 202011287646.4

(51) Int. Cl.
*H02J 50/12* (2016.01)
*H01F 27/28* (2006.01)

(52) U.S. Cl.
CPC .............. *H02J 50/12* (2016.02); *H01F 27/28* (2013.01)

(58) Field of Classification Search
CPC ................................. H02J 50/12; H01F 27/28
See application file for complete search history.

(56) References Cited

U.S. PATENT DOCUMENTS

| 6,037,740 | A  | * | 3/2000 | Pollock | B60L 50/53 318/254.2 |
| 2013/0088088 | A1 | * | 4/2013 | Wambsganss | H02J 7/025 307/104 |
| 2015/0015197 | A1 | * | 1/2015 | Mi | H02J 5/005 320/108 |
| 2015/0188364 | A1 | * | 7/2015 | Kurashima | H02J 50/005 307/104 |
| 2017/0098502 | A1 | * | 4/2017 | Chuang | H01F 3/10 |

* cited by examiner

*Primary Examiner* — Jared Fureman
*Assistant Examiner* — Michael J Warmflash
(74) *Attorney, Agent, or Firm* — IPRO, PLLC

(57) ABSTRACT

The disclosure provides a balanced-current circuit structure and a parameter design method for a bifilar winding coil of wireless power transfer. The disclosure relates to the technical field of magnetic coupling wireless power transfer. The circuit includes a bifilar winding coil, a compensation capacitor array and a controlled voltage source array. The bifilar winding coil includes a first coil and a second coil, the compensation capacitor array includes a first compensation capacitor and a second compensation capacitor, and the controlled voltage source array includes a first controlled voltage source and a second controlled voltage source. Compared with the existing centralized series compensation scheme, the scheme proposed by the disclosure can realize the currents in two windings of the bifilar winding coil being basically the same, so as to eliminate the current imbalance problem existing in the traditional compensation mode, thereby fully exerting the current-carrying capacity of the bifilar winding coil, and improving the practicability of the bifilar winding coil in practical applications.

3 Claims, 3 Drawing Sheets

Measure self-inductance of the first coil and the second coil respectively, wherein L1 and L2 represent the self-inductance of the first coil and the second coil, respectively Measure mutual inductance between the first coil and the second coil in the bifilar winding coil, wherein M12 represents the mutual inductance between the first coil and the second coil Configure compensation capacitors in a compensation capacitor array to the two coils in the bifilar winding coil, respectively, and when a working frequency is $\omega$, determining capacitance of a first compensation capacitor and a second compensation capacitor by the following formulas, respectively: $C1=1/(\omega^2*(L1+M12))$, $C2=1/(\omega^2*(L2+M12))$, wherein C1 and C2 represent the capacitance of the first compensation capacitor and the second compensation capacitor, respectively.

Fig. 6

BALANCED-CURRENT CIRCUIT STRUCTURE AND PARAMETER DESIGN METHOD FOR BIFILAR WINDING COIL OF WIRELESS POWER TRANSFER

TECHNICAL FIELD

The disclosure relates to the technical field of magnetic coupling wireless power transfer, and provides a balanced-current circuit structure and a parameter design method for a bifilar winding coil of wireless power transfer.

BACKGROUND

In a wireless power transfer system, in order to improve the current-carrying capacity of the coil without significantly changing the shape of a coupling coil, researchers have proposed a multiple-winding scheme. Each winding in the multiple-winding coil can be regarded as an independent coil, and there is strong coupling between multiple coils. Since it is impossible to achieve the same coil parameters for each winding in practical winding, in practical applications, there is a problem of unbalanced current in each winding in the multiple-winding coil, which causes that the advantage of the improved current-carrying capacity of multiple windings of coils can not be fully exerted.

SUMMARY

In order to realize the current balance in each winding in a bifilar winding coil, based on the idea of each winding independent compensation, the disclosure optimizes compensation capacitors to realize the approximate balance of the currents in the two windings by analyzing the influence of the compensation capacitors on the current balance. The disclosure provides a balanced-current circuit structure and a parameter design method for a bifilar winding coil of wireless power transfer. The disclosure provides the following technical scheme:

A balanced-current circuit for a bifilar winding coil of wireless power transfer includes a bifilar winding coil, a compensation capacitor array and a controlled voltage source array, wherein the bifilar winding coil includes a first coil and a second coil, the compensation capacitor array includes a first compensation capacitor and a second compensation capacitor, and the controlled voltage source array includes a first controlled voltage source and a second controlled voltage source;

one end of the first coil is connected with one end of the first compensation capacitor, and the other end of the first compensation capacitor is connected with one end of the first controlled voltage source; and one end of the second coil is connected with one end of the second compensation capacitor, and the other end of the second compensation capacitor is connected with one end of the second controlled voltage source.

Preferably, the other ends of the first coil and the second coil are both connected with one end of a load resistor or a voltage source, and the other ends of the first controlled voltage source and the second controlled voltage source are both connected with the other end of the load resistor or the voltage source.

A parameter design method for a balanced-current circuit for a bifilar winding coil of wireless power transfer includes the following steps:

step 1: measuring self-inductance of a first coil and a second coil respectively, wherein $L_1$ and $L_2$ represent the self-inductance of the first coil and the second coil respectively;

step 2: measuring mutual inductance between the two coils in the bifilar winding coil, wherein $M_{12}$ represents the mutual inductance between the first coil and the second coil; and step 3: configuring compensation capacitors in a compensation capacitor array to the two coils in the bifilar winding coil respectively, and when the working frequency is w, determining the capacitance of a first compensation capacitor and a second compensation capacitor respectively by the following formulas:

$$C_1 = 1/(\omega^2 * (L_1 + M_{12})),$$

$$C_2 = 1/(\omega^2 * (L_2 \pm M_{12})),$$

wherein $C_1$ and $C_2$ represent the capacitance of the first compensation capacitor and the second compensation capacitor respectively.

The disclosure has the following beneficial effects:

Compared with the existing centralized series compensation scheme, the scheme proposed by the disclosure can realize the currents in two windings of the bifilar winding coil being basically the same, so as to eliminate the current imbalance problem existing in the traditional compensation mode, thereby fully exerting the current-carrying capacity of the bifilar winding coil, and improving the practicability of the bifilar winding coil in practical applications.

BRIEF DESCRIPTION OF FIGURES

FIG. 6 shows a flowchart for a method according to an embodiment.

DETAILED DESCRIPTION

Figure 1:
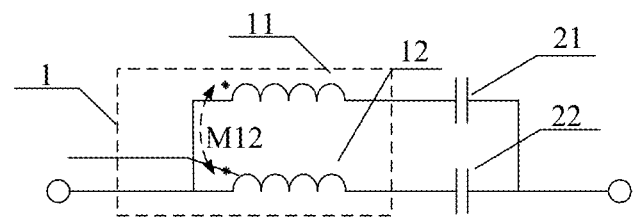
FIG. 1 is a structural diagram of a balanced-current circuit structure for a bifilar winding coil of wireless power transfer realized by independent series compensation.

The disclosure will be described in detail below with reference to specific embodiments.

Specific embodiment 1:

As shown in FIG. 1 to FIG. 5, the disclosure provides a balanced-current circuit structure and a parameter design method for a bifilar winding coil of wireless power transfer.

Specifically, a balanced-current circuit for a bifilar winding coil of wireless power transfer includes a bifilar winding coil 1, a compensation capacitor array and a controlled voltage source array.

The bifilar winding coil 1 includes a first coil 11 and a second coil 12. The compensation capacitor array includes a first compensation capacitor 21 and a second compensation capacitor 22. The controlled voltage source array includes a first controlled voltage source and a second controlled voltage source.

One end of the first coil 11 is connected with one end of the first compensation capacitor 21. The other end of the first compensation capacitor 21 is connected with one end of the first controlled voltage source. One end of the second coil 12 is connected with one end of the second compensation capacitor 22. The other end of the second compensation capacitor 22 is connected with one end of the second controlled voltage source.

The other ends of the first coil 11 and the second coil 12 are both connected with one end of a load resistor or a voltage source. The other ends of the first controlled voltage source and the second controlled voltage source are both connected with the other end of the load resistor or the voltage source.

A parameter design method for a balanced-current circuit for a bifilar winding coil of wireless power transfer includes the following steps:

step 1: measuring self-inductance of a first coil and a second coil respectively, wherein $L_1$ and $L_2$ represent the self-inductance of the first coil and the second coil respectively;

step 2: measuring mutual inductance between the two coils in the bifilar winding coil, wherein $M_{12}$ represents the mutual inductance between the first coil and the second coil; and step 3: configuring compensation capacitors in a compensation capacitor array to the two coils in the bifilar winding coil respectively, and when the working frequency is co, determining the capacitance of a first compensation capacitor and a second compensation capacitor respectively by the following formulas:

$$C_1 = 1/(\omega^2 * (L_1 + M_{12})),$$

$$C_2 = 1/(\omega^2 * (L_2 + M_{12})),$$

wherein $C_1$ and $C_2$ represent the capacitance of the first compensation capacitor and the second compensation capacitor respectively.

The disclosure can realize approximately equal currents of the corresponding coils of each winding, and the system works in a resonant state.

When the bifilar winding coil is used for a wireless power receiver, assuming that the resistance rating of an alternating current equivalent load 4 is $R_s$ and the induced voltages of two single-winding coils are respectively $U_{s1}$ and $U_{s2}$, under the practical application condition that $\omega L_i/R_s$ (i=1,2) is significantly greater than 1 and the difference between $U_{s1}$ and $U_{s2}$ is not too large, the current of each winding of coil may be calculated to be approximately equal to $(U_{s1}+U_{s2})/4R_s$.

When the bifilar winding coil is used for a wireless power transmitter, the analysis process is similar to that of the receiver, and assuming that the resistance rating of an input equivalent load is $R_p$ and the reverse induced voltage of a receiving coil on two single-winding transmitting coils is $U_{p1}$ and $U_{p2}$ respectively, under the practical application condition that $\omega L_i/R_s$ (i=1, 2) is significantly greater than 1 and the difference between $U_{p1}$ and $U_{p2}$ is not too large, the current of each winding of coil can be calculated to be approximately equal to $(U_{s1}+U_{s2})/4R_p$.

Figure 2:
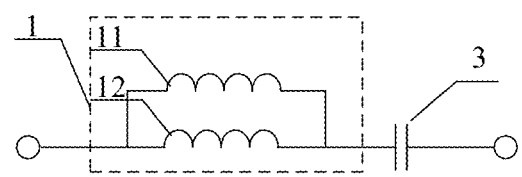
FIG. 2 is a structural diagram of a compensation circuit of a bifilar winding coil adopting traditional centralized series compensation.

Compared with the existing centralized series compensation scheme (as shown in FIG. 2), the scheme proposed by the disclosure can realize basically the same currents in two windings of the bifilar winding coil, so as to eliminate the current imbalance problem existing in the traditional compensation mode.

Figure 3:
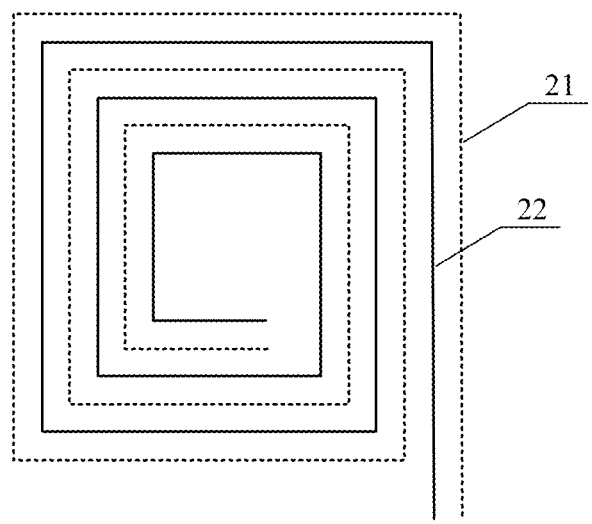
FIG. 3 is a schematic diagram of a square bifilar winding coil.

FIG. 3 shows a bifilar winding coil with a typical square structure. By using a bifilar winding mode to wind coils, a wire with a small current-carrying capacity can be used to wind a coil with a large current-carrying capacity. Furthermore, compared with a cross-winding mode for improving the current balance by Litz wires, the bifilar winding mode is more conducive to the flat design of the coil, but causes the problem of current imbalance.

Figure 4:
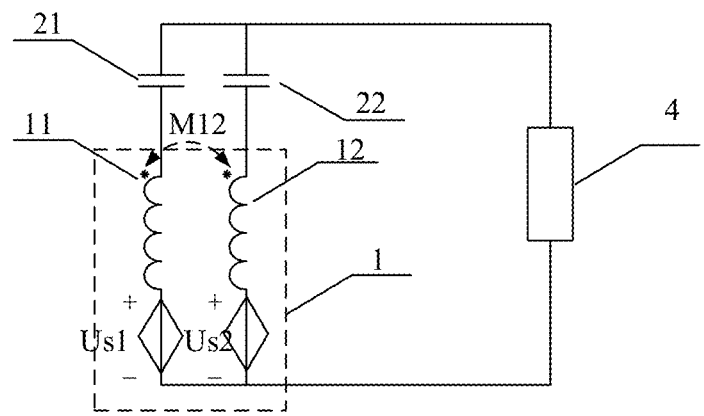
FIG. 4 shows an equivalent circuit of a receiver with a bifilar winding receiving coil and an independent series compensation structure.

FIG. 4 shows an equivalent circuit of a receiver with a bifilar winding receiving coil and an independent series compensation structure. When $C_1=1/(\omega^2*(L_1+M_{12}))$ and $C_2=1/(\omega^2*(L_2+M_{12}))$, assuming that the resistance rating of the alternating current equivalent load 4 is $R_s$ and the induced voltages of the two single-winding coils are respectively $U_{s1}$ and $U_{s2}$, according to the Kirchhoff Voltage Law $U_{s1}=j\omega M_{12} (I_2-I_1)+(I_1+I_2)R_s$ and $U_{s2}=j\omega M_{12} (I_1-I_2)+(I_1+I_2)R_s$, the current of the first coil 11 can be calculated as:

$$I_1 = \frac{j(U_{s1} - U_{s2}) + (U_{s1} + U_{s2})M_{12}\omega/R_s}{4M_{12}\omega},$$

and the current of the second coil 12 can be calculated as:

$$I_2 = \frac{-j(U_{s1} - U_{s2}) + (U_{s1} + U_{s2})M_{12}\omega/R_s}{4M_{12}\omega}.$$

Since the coils corresponding to two parallel-wound windings are closely coupled, the mutual inductance $M_{12}$ and the self-inductance of the single-winding coil are of the same order of magnitude, so $M_{12}\omega/R_s$ is significantly greater than 1. Although the induced voltages of the two single-winding coils have a difference, the difference is not too large, so $$I_1 \approx \frac{U_{s1} + U_{s2}}{4R_s}.$$

In the same way, $$I_2 \approx \frac{U_{s1} + U_{s2}}{4R_s},$$

so $I_1 \approx I_2$, and current balance can be realized.

Figure 5:
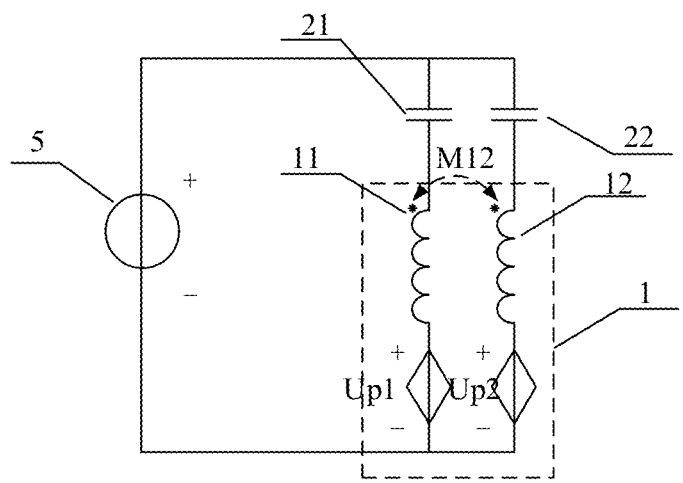
FIG. 5 shows an equivalent circuit of a transmitter with a bifilar winding transmitting coil and an independent series compensation structure.

FIG. 5 shows an equivalent circuit of a transmitter with a bifilar winding transmitting coil. A voltage source 5 can be regarded as a negative resistor, which has the same properties as when FIG. 5 is used for the receiver. When $C_1=1/(\omega^2*(L_1+M_{12}))$ and $C_2=1/(\omega^2*(L_2+M_{12}))$, assuming that the resistance rating of the input equivalent load is $R_p$ and the induced voltages of the two single-winding coils are respectively $U_{p1}$ and $U_{p2}$, the current of the first coil 11 can be calculated as:

$$I_1 = \frac{j(U_{p1} - U_{p2}) - (U_{p1} + U_{p2})M_{12}\omega/R_p}{4M_{12}\omega},$$

and the current of the second coil 12 can be calculated as:

$$I_2 = \frac{-j(U_{p1} - U_{p2}) - (U_{p1} + U_{p2})M_{12}\omega/R_p}{4M_{12}\omega}.$$

For the current of the first coil 11, since the coils corresponding to two parallel-wound windings are closely coupled, the mutual inductance $M_{12}$ and the self-inductance of the single-winding coil are of the same order of magnitude, so $M_{12}\omega/R_p$ is significantly greater than 1. Although the reverse induced voltages of the receiving coil on two single-winding transmitting coils have a difference, the difference is not too large, so the imaginary part in the current expression is approximately equal to 0, that is, $$I_1 \approx -\frac{U_{p1} + U_{p2}}{4R_p}.$$

In the same way, $$I_2 \approx -\frac{U_{p1} + U_{p2}}{4R_p},$$

so $I_1 \approx I_2$, and current balance can be realized.

The analysis processes of the above examples can be further extended to n-winding parallel-wound coils to achieve current balance analysis in wireless power transmitter or receiver applications.

The above descriptions are only preferred implementation manners of the balanced-current circuit structure and a parameter design method for a bifilar winding coil of wireless power transfer. The protection scope of the bifilar winding wireless power transfer coil circuit structure with balanced current between windings and the parameter design method is not limited to the above examples. All technical schemes based on this idea belong to the protection scope of the disclosure. It should be noted that those skilled in the art can make several improvements and changes without departing from the principle of the disclosure, and these improvements and changes should also be regarded as the protection scope of the disclosure.

What is claimed is:

1. A balanced-current circuit for a bifilar winding coil of wireless power transfer, comprising a bifilar winding coil, and a compensation capacitor array,
   wherein the bifilar winding coil comprises a first coil and a second coil, and the compensation capacitor array comprises a first compensation capacitor and a second compensation capacitor;
   one end of the first coil is connected with one end of the first compensation capacitor;
   one end of the second coil is connected with one end of the second compensation capacitor;
   the other end of the first coil is connected with the other end of the second coil; and
   the other end of the first compensation capacitor is connected with the other end of the second compensation capacitor.

2. The balanced-current circuit of claim 1, wherein the other ends of the first coil and the second coil are both connected with one end of a load resistor or a third voltage source, and the other ends of the first compensation capacitor and the second compensation capacitor are both connected with the other end of the load resistor or the third voltage source.

3. A method of using the balanced-current circuit of claim 1, comprising the following steps:
   step 1: measuring self-inductance of the first coil and the second coil respectively, wherein $L_1$ and $L_2$ represent the self-inductance of the first coil and the second coil, respectively;
   step 2: measuring mutual inductance between the first coil and the second coil in the bifilar winding coil, wherein $M_{12}$ represents the mutual inductance between the first coil and the second coil; and
   step 3: configuring compensation capacitors in a compensation capacitor array to the two coils in the bifilar winding coil, respectively, and when a working frequency is ω, determining capacitance of a first compensation capacitor and a second compensation capacitor by the following formulas, respectively:

$C_1 = 1/(\omega\char`\^2*(L_1+M_{12}))$, $C_2 = 1/(\omega\char`\^2*(L_2+M_{12}))$, wherein $C_1$ and $C_2$ represent the capacitance of the first compensation capacitor and the second compensation capacitor, respectively.

* * * * *